US012657856B2

(12) United States Patent

Serikawa et al.

(10) Patent No.: US 12,657,856 B2

(45) Date of Patent: ***Jun. 16, 2026

(54) READING DEVICE, OUTPUT DEVICE, AND IMAGE FORMING APPARATUS

(71) Applicant: FUJIFILM Business Innovation Corp., Tokyo (JP)

(72) Inventors: Masato Serikawa, Kanagawa (JP); Yoji Nishida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,464

(22) Filed: Mar. 23, 2023

(65) Prior Publication Data

US 2024/0078779 A1 Mar. 7, 2024

(30) Foreign Application Priority Data

Sep. 5, 2022 (JP) ................................. 2022-140435

(51) Int. Cl.
*G06V 10/10* (2022.01)
*G06V 10/141* (2022.01)

(52) U.S. Cl.
CPC .................................. *G06V 10/141* (2022.01)

(58) Field of Classification Search
CPC .................................................... G06V 10/141
See application file for complete search history.

(56) References Cited

U.S. PATENT DOCUMENTS

| | | | | |
|---|---|---|---|---|
| 2007/0091465 A1* | 4/2007 | Ichikawa | ............... | G02B 26/10 359/726 |
| 2021/0270600 A1* | 9/2021 | Yoshioka | ................ | G01S 17/46 |

FOREIGN PATENT DOCUMENTS

JP 2010130444 6/2010

* cited by examiner

*Primary Examiner* — Ibrahim Siddo

(74) *Attorney, Agent, or Firm* — JCIPRNET

(57) ABSTRACT

A reading device includes a radiator configured to radiate light, a light receiver configured to receive the light reflected from an image capturing target, a first optical path on which the light radiated by the radiator is reflected by a reflection surface to irradiate a surface of the image capturing target in a radiation area so that diffuse reflection light diffusely reflected by the surface of the image capturing target is guided to the light receiver as a read image, a second optical path on which the light radiated by the radiator is reflected by the reflection surface to irradiate the surface of the image capturing target in the radiation area so that regular reflection light regularly reflected by the surface of the image capturing target is guided to the light receiver as a read image, and a switcher configured to switch the first optical path and the second optical path on a downstream side in a movement direction of a carriage that houses the radiator and the reflection surface and moves along a sub-scanning direction for image reading.

20 Claims, 10 Drawing Sheets

FIG. 6

READING DEVICE, OUTPUT DEVICE, AND IMAGE FORMING APPARATUS

CROSS-REFERENCE TO RELATED APPLICATIONS

This application is based on and claims priority under 35 USC 119 from Japanese Patent Application No. 2022-140435 filed Sep. 5, 2022.

BACKGROUND

(i) Technical Field

The present disclosure relates to a reading device, an output device, and an image forming apparatus.

(ii) Related Art

There is known a reading device including a transparent plate member that supports a document, a first radiator that radiates light from the plate member side to read diffuse reflection light from the document supported on the plate member, a light guide that guides, to a predetermined position, the diffuse reflection light originating from the light radiated by the first radiator, a generator that generates a signal based on the light received at the predetermined position, and a second radiator that radiates light from the plate member side to read a part of a regular reflection light component from the document supported on the plate member. The second radiator radiates light so that the part of the regular reflection light component is guided by the light guide and a signal is generated by the generator at the predetermined position. The incident angle of the light on the document from the second radiator includes an offset angle that is not 0° from the reflection angle of the principal ray of the regular reflection light to be guided by the light guide (Japanese Unexamined Patent Application Publication No. 2010-130444).

SUMMARY

Aspects of non-limiting embodiments of the present disclosure relate to image reading based on regular reflection light and diffuse reflection light from an image capturing target by light radiation from one light source.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device comprising: a radiator configured to radiate light; a light receiver configured to receive the light reflected from an image capturing target; a first optical path on which the light radiated by the radiator is reflected by a reflection surface to irradiate a surface of the image capturing target in a radiation area so that diffuse reflection light diffusely reflected by the surface of the image capturing target is guided to the light receiver as a read image; a second optical path on which the light radiated by the radiator is reflected by the reflection surface to irradiate the surface of the image capturing target in the radiation area so that regular reflection light regularly reflected by the surface of the image capturing target is guided to the light receiver as a read image; and a switcher configured to switch the first optical path and the second optical path on a downstream side in a movement direction of a carriage that houses the radiator and the reflection surface and moves along a sub-scanning direction for image reading.

BRIEF DESCRIPTION OF THE DRAWINGS

Exemplary embodiments of the present disclosure will be described in detail based on the following figures, wherein:

FIG. 6 is a schematic sectional view of an image reader, illustrating disposition of a white reference plate;

DETAILED DESCRIPTION

Exemplary embodiments and specific examples of the present disclosure are described in detail below with reference to the drawings. The exemplary embodiment and the specific example of the present disclosure are not limited to those exemplary embodiments and specific examples.

In the following description using the drawings, the drawings are schematic drawings and the dimensional ratios and other factors may differ from actual ones. Illustration is omitted as appropriate except for members to be described for the sake of understanding.

(1) Overall Structure and Operation of Image Forming Apparatus

Figure 1:
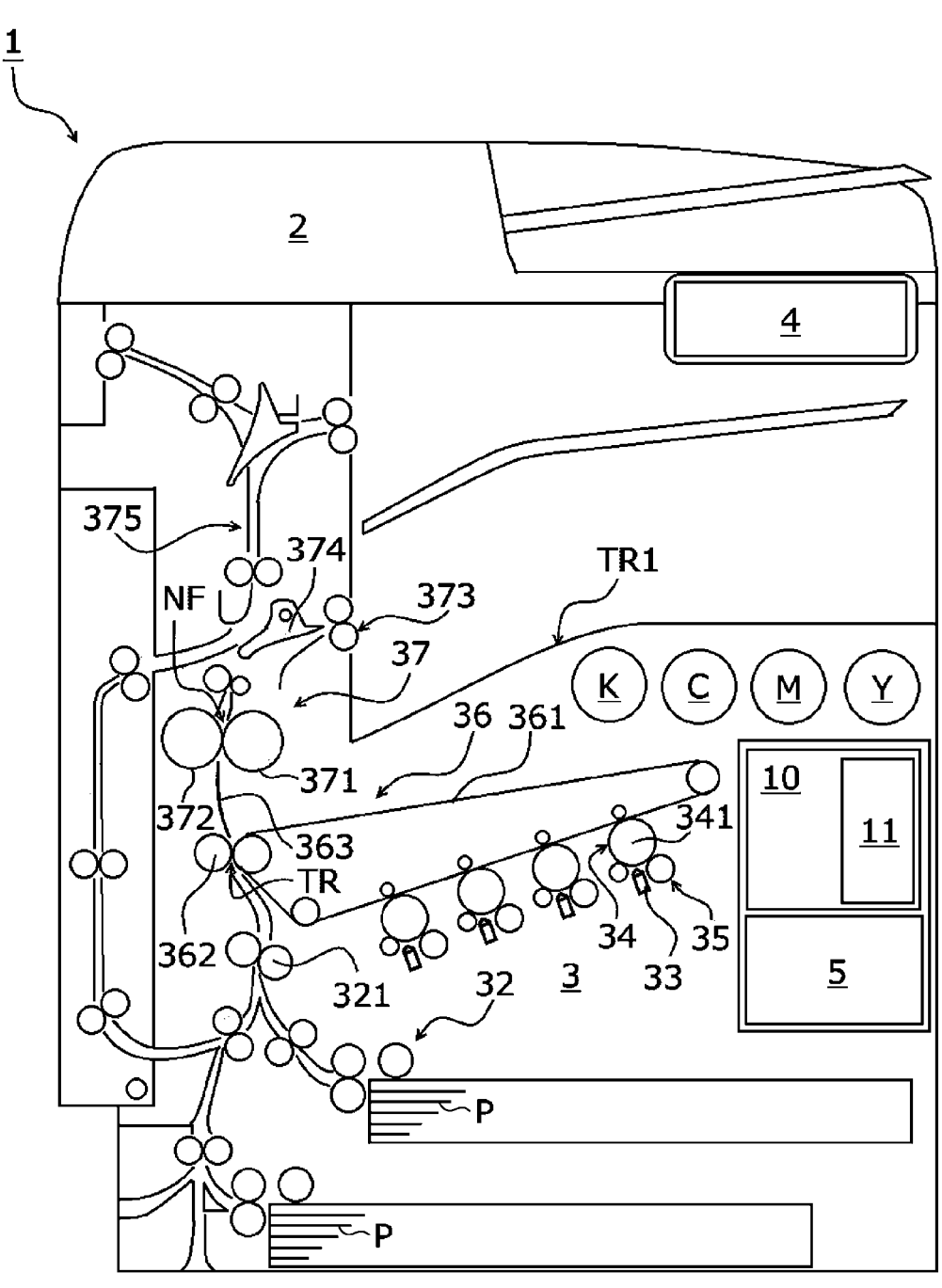
FIG. 1 is a schematic sectional view illustrating the internal structure of an image forming apparatus including a reading device.
Figure 2:
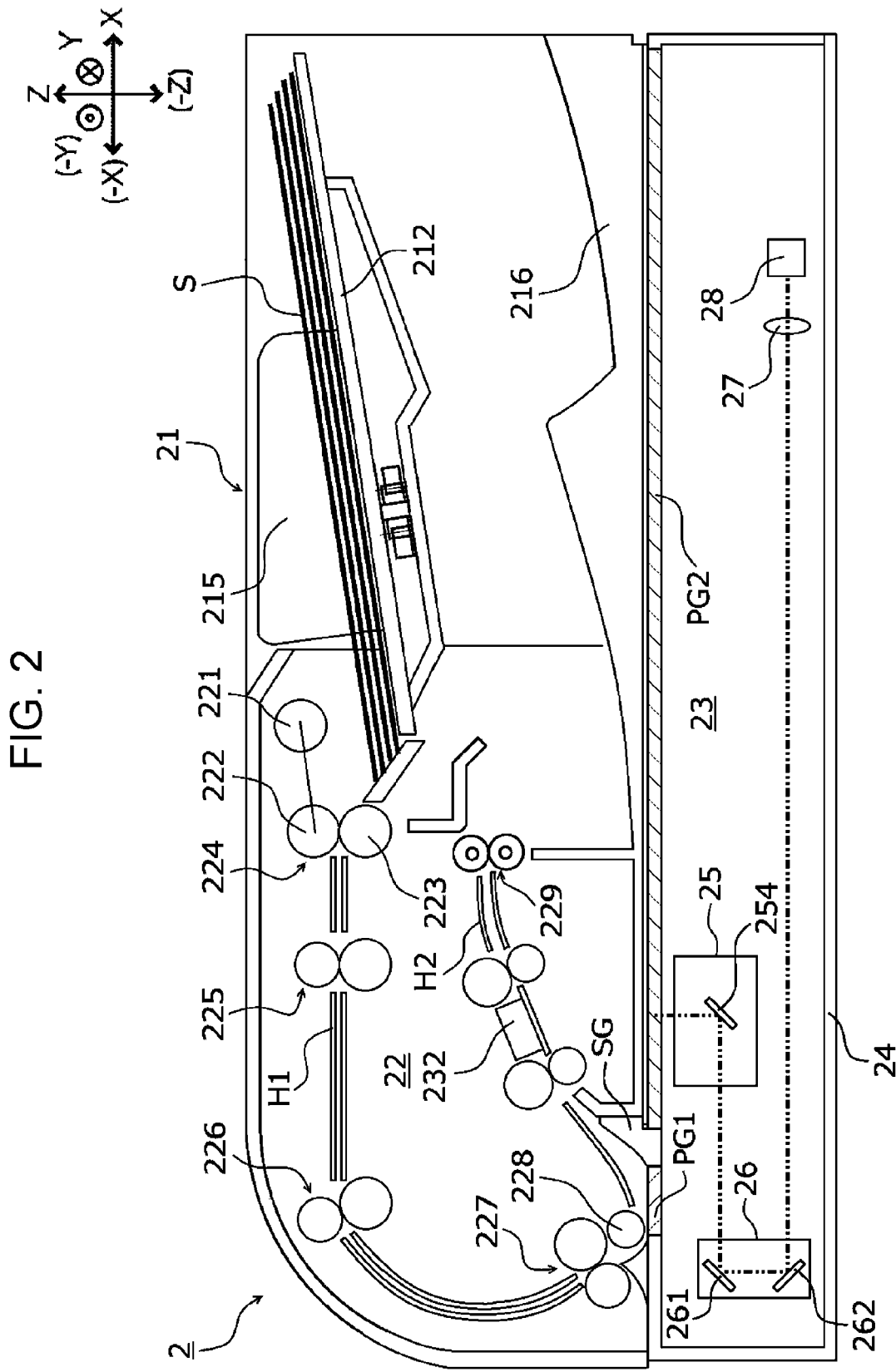
FIG. 2 is a sectional structural view illustrating the internal structure of the reading device.

FIG. 1 is a schematic sectional view illustrating the internal structure of an image forming apparatus 1 including a reading device 2 according to the exemplary embodiments. FIG. 2 is a sectional structural view illustrating the internal structure of the reading device 2.

The overall structure and operation of the image forming apparatus 1 are described below with reference to the drawings.

(1.1) Overall Structure

The image forming apparatus 1 includes the reading device 2 that reads an image from a sheet S such as a document and converts the image into image data, an image former 3 serving as an image recorder that prints the read image data on paper serving as a recording medium, an operation information unit 4 serving as a user interface, and an image processor 5.

The reading device 2 includes a sheet stacker 21, an automatic sheet feeder 22, and an image reader 23. The automatic sheet feeder 22 transports a sheet S placed on the sheet stacker 21 to a reading position of the image reader 23. An image read by an image sensor 28 such as a charge coupled device (CCD) line sensor of the image reader 23 is converted into image data that is an electric signal. An image of the entire sheet S placed on a platen glass PG2 ("PG2" in FIG. 2) is read while sequentially moving a carriage 25 in a sub-scanning direction X.

The image former 3 includes paper feeders 32, exposing devices 33, photoconductor units 34, developing devices 35, a transfer device 36, and a fixing device 37. The image former 3 forms a toner image on paper P fed from the paper feeder 32 based on image information received from the image processor 5.

The operation information unit 4 serving as the user interface is disposed on the front side of the reading device 2. The operation information unit 4 is a combination of a liquid crystal display panel, various operation buttons, and a touch panel. A user of the image forming apparatus 1 inputs various settings and instructions via the operation information unit 4. The liquid crystal display panel displays various types of information for the user of the image forming apparatus 1.

The image processor 5 generates image data based on an image read by the reading device 2 or printing information transmitted from an external device (e.g., a personal computer).

(1.2) Image Former

In synchronization with an image forming timing, the paper feeder 32 feeds designated paper P to the image former 3 for each copy of printing in a print job.

The photoconductor units 34 are arranged above the paper feeder 32 and include photoconductor drums 341 to be driven to rotate. The exposing devices 33 form electrostatic latent images on the photoconductor drums 341. The developing devices 35 form yellow (Y), magenta (M), cyan (C), and black (K) toner images on the photoconductor drums 341 having the electrostatic latent images.

The color toner images formed on the photoconductor drums 341 of the photoconductor units 34 are electrostatically transferred (firstly transferred) in sequence onto an intermediate transfer belt 361 of the transfer device 36, thereby forming superposed toner images with color toners superposed one on top of the other. The superposed toner images on the intermediate transfer belt 361 are collectively transferred by a second transfer roller 362 onto paper P fed from a registration roller pair 321 and guided by a transport guide.

The fixing device 37 forms a fixing nip NF (fixing area) by a press-contact area between a heating module 371 and a pressurizing module 372 in pairs.

The paper P having the toner images collectively transferred by the transfer device 36 is transported to the fixing nip NF of the fixing device 37 via a transport guide 363 with the toner images unfixed. The toner images are fixed by heating and pressurizing operations of the heating module 371 and the pressurizing module 372 in pairs.

The paper P having the fixed toner images is guided by a switching gate 374 and output and received onto a paper output tray TR1 on the top of the image forming apparatus 1 by a first output roller pair 373. To reverse the paper P for duplex printing or output the paper P with its image-recorded side oriented upward, the transport direction is switched toward a transport path 375 by the switching gate 374.

(1.3) Reading Device

The sheet stacker 21 includes a sheet tray 212 where an image-recorded sheet S is placed as an example of an image capturing target.

The automatic sheet feeder 22 includes a nudger roller 221 that picks up the sheets S on the sheet tray 212 sequentially from the top, and a separator 224 including a feed roller 222 and a retard roller 223.

When overlapping sheets S are fed to a nip N in the separator 224, the feed roller 222 and the retard roller 223 in pairs separates (isolates) the sheets S and transports them to the image reader 23 one by one.

In a sheet transport path H1, takeaway rollers 225 are disposed at a downstream position of the feed roller 222 in a transport direction of the sheet S. The takeaway rollers 225 transport the sheet S fed out by the feed roller 222 to preregistration rollers 226.

Registration rollers 227 that adjust the transport timing of the sheet S are disposed on a downstream side of the preregistration rollers 226. The preregistration rollers 226 correct a skew by forming a loop with the leading edge of the sheet S abutting against the stopped registration rollers 227. The registration rollers 227 are driven to rotate in synchronization with a reading start timing. The sheet S is pushed against a reading glass PG1 by a platen roller 228 with the loop maintained by the takeaway rollers 225 and the preregistration rollers 226, and the front surface of the sheet S is read by the image reader 23.

The sheet S having passed along the reading glass PG1 is guided by a sheet guide SG and transported to a reading sensor 232 that reads the back surface. The sheet S whose front surface has been read by the image reader 23 is transported along a sheet transport path H2 with the back surface being read by the reading sensor 232, and is output to a paper output tray 216 below the sheet stacker 21 by output rollers 229.

The image reader 23 is a so-called reduction optics reading device structured as follows. The platen glass PG2 where the sheet S is placed is disposed on the upper side of the housing 24. The carriage 25 reciprocally movable in the sub-scanning direction (lateral direction: X direction), a carriage 26, an imaging lens 27, and the image sensor 28 are disposed in the housing 24.

The image reader 23 has those illustrated components with a width in a main scanning direction (depth direction: Y direction). The carriage 25, the carriage 26, the imaging lens 27, and the image sensor 28 have elongated shapes with their longitudinal directions corresponding to the main scanning direction Y.

When reading the sheet S, the carriage 25 moves in the sub-scanning direction X at a predetermined speed. The carriage 25 includes a radiator that radiates light to the sheet S. The radiator is described later with reference to FIG. 3. The carriage 25 includes a mirror 254 that reflects the light reflected by the sheet S. The reflected light is guided to an optical path B1 leading to the image sensor 28.

When reading the sheet S, the carriage 26 moves in the sub-scanning direction X at a speed that is half the speed of the carriage 25. The carriage 26 includes a mirror 261 and a mirror 262. The mirrors 261 and 262 reflect the light reflected by the mirror 254 to guide the light to the optical path B1. The imaging lens 27 images the light reflected by the mirror 262 at a predetermined position.

The image sensor 28 includes a light receiving element such as a charge coupled device (CCD). The image sensor 28 receives the light imaged by the imaging lens 27 and generates an analog image signal based on the received light.

When the sheet S is placed on the platen glass PG2, the carriage 25 sequentially moves in the sub-scanning direction X and reads image information on each line, thereby reading an image of the entire sheet S by guiding the reflected light from the sheet S to the image sensor 28.

(2) Principal Structure and Operation of Image Reader

Figure 3:
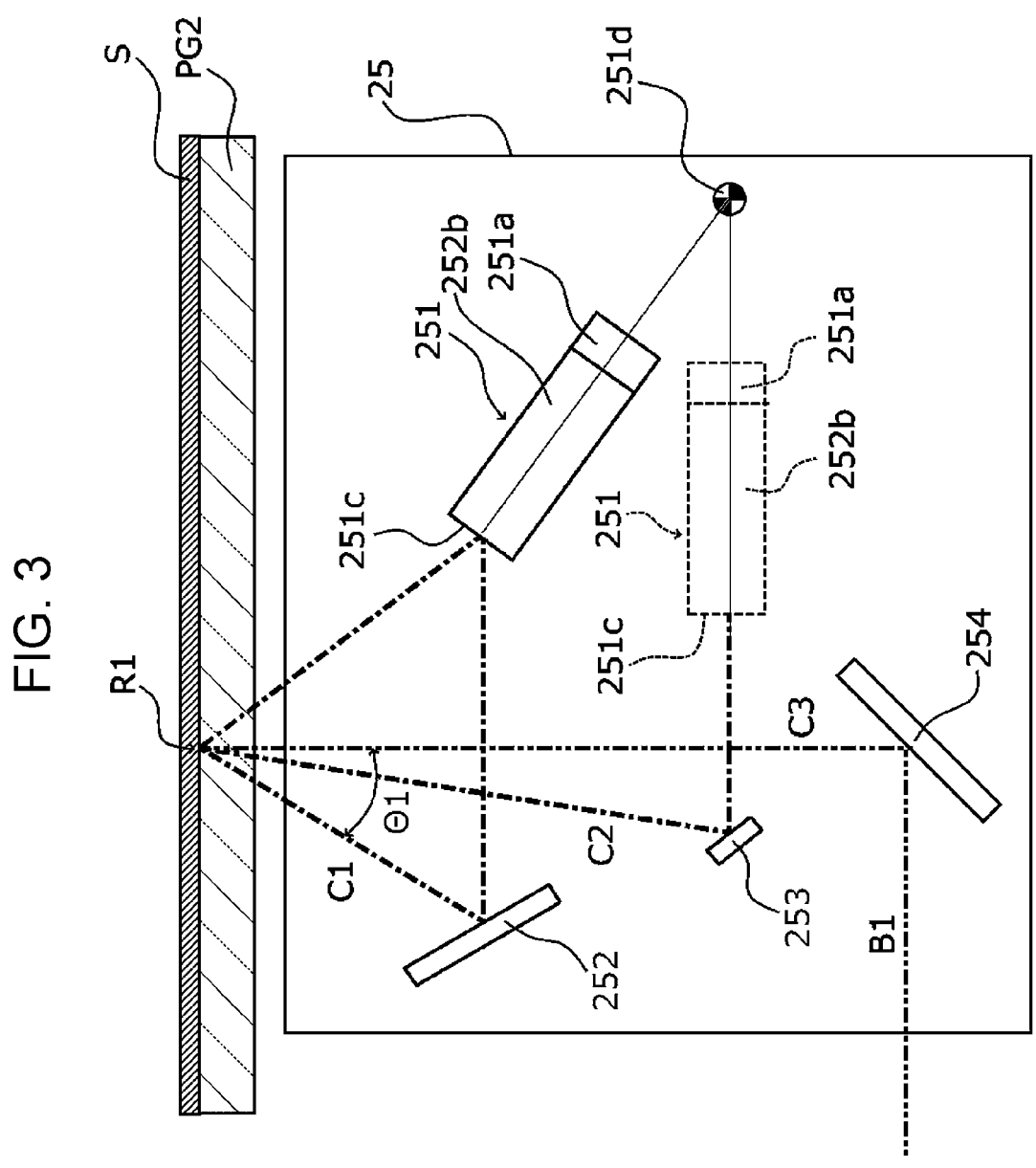
FIG. 3 is a schematic enlarged sectional view illustrating the internal structure of a carriage in which a light emitter is at a first position.
Figure 4:
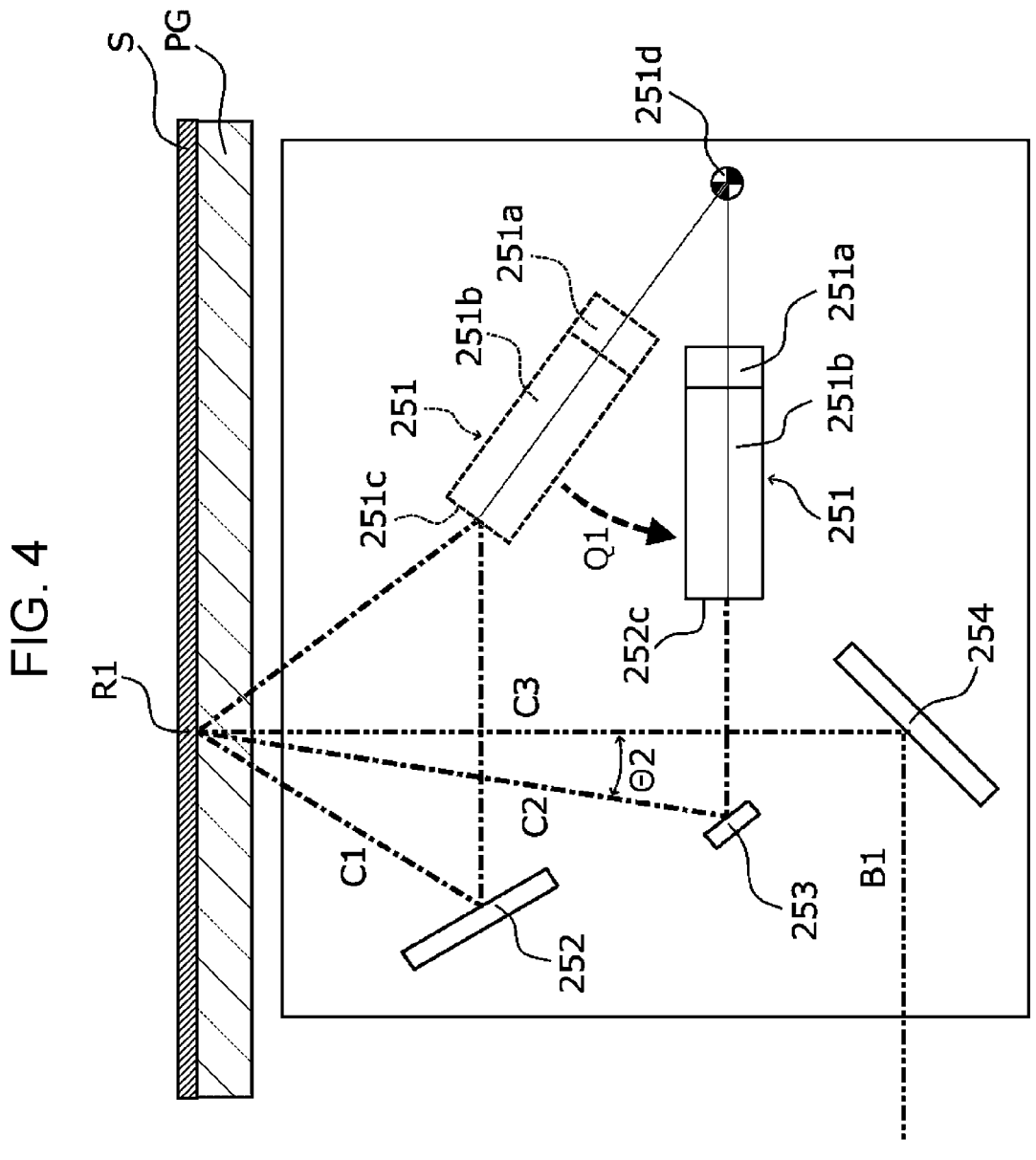
FIG. 4 is a schematic enlarged sectional view illustrating the internal structure of the carriage in which the light emitter is at a second position.
Figures 5A, 5B:
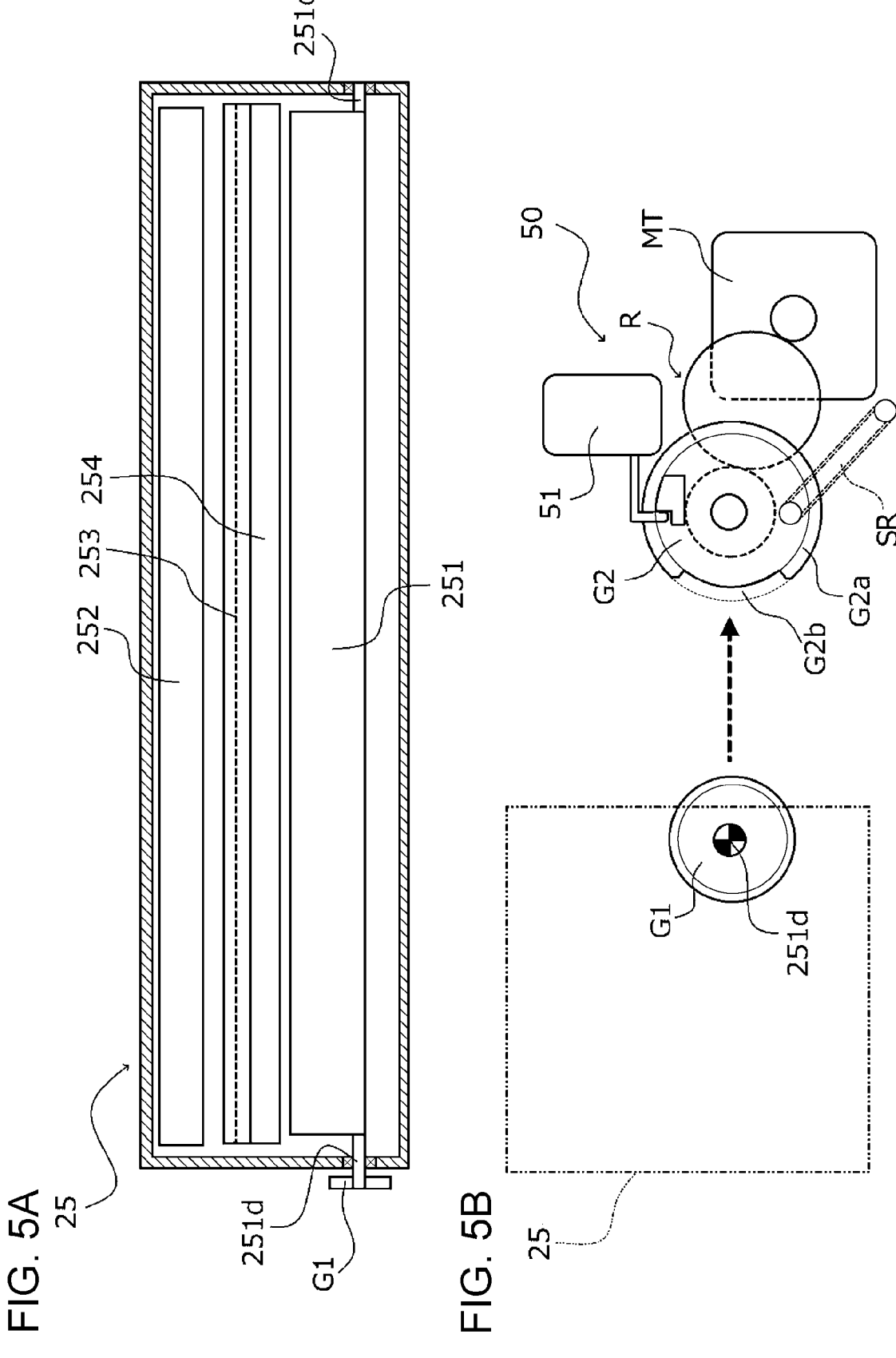
FIG. 5A is a schematic sectional plan view illustrating the internal structure of the carriage.
FIG. 5B illustrates the structure of a switching mechanism.

FIG. 3 is a schematic enlarged sectional view illustrating the internal structure of the carriage 25 in which a light emitter 251 is at a first position to form a first optical path. FIG. 4 is a schematic enlarged sectional view illustrating the internal structure of the carriage 25 in which the light emitter 251 is at a second position to form a second optical path. FIG. 5A is a schematic sectional plan view illustrating the internal structure of the carriage 25. FIG. 5B illustrates the structure of a switching mechanism 50.

(2.1) Principal Structure of Image Reader

The image reader 23 includes the carriage 25 and the switching mechanism 50. The carriage 25 houses the light emitter 251, a diffuse reflector 252, a regular reflector 253, and a mirror 254. The light emitter 251 is an example of the radiator that radiates light. The diffuse reflector 252 is an example of a reflection surface on a first optical path C1. The regular reflector 253 is an example of a reflection surface on a second optical path C2. The mirror 254 is disposed vertically below a radiation area R1 serving as a reading area, and reflects, toward the carriage 26, reflected light on an optical path C3 common to the first optical path C1 and the second optical path C2. The carriage 25 is reciprocally movable in the sub-scanning direction (lateral direction: X direction). The switching mechanism 50 is an example of a switcher that switches the first optical path C1 and the second optical path C2 on a downstream side in the movement direction of the carriage 25.

In the carriage 25, the first optical path C1 and the second optical path C2 are switchable. On the first optical path C1, the light radiated by the light emitter 251 is reflected by the diffuse reflector 252 to irradiate the surface of the sheet S serving as the image capturing target in the radiation area R1 so that diffuse reflection light diffusely reflected by the surface of the sheet S is guided to the image sensor 28 as a read image. On the second optical path C2, the light radiated by the light emitter 251 is reflected by the regular reflector 253 to irradiate the surface of the sheet S in the radiation area R1 so that regular reflection light regularly reflected by the surface of the sheet S is guided to the image sensor 28 as a read image.

The light emitter 251 includes a light source 251a, a light guide 251b, and an exit surface 251c. The light emitter 251 emits light from the exit surface 251c. Examples of the light source 251a include a light emitting diode (LED) that emits light. The light guide 251b is a transparent member through which light passes.

The light emitter 251 includes a rotation shaft 251d at the end of the light source 251a. As illustrated in FIGS. 3 and 4, the light guide 251b of the light emitter 251 integrally rotates about the rotation shaft 251d (arrow Q1 in FIG. 4). Therefore, the light emitter 251 is rotatable between the first position where a part of the exit surface 251c is oriented to the diffuse reflector 252 (FIG. 3) and the second position where the exit surface 251c is oriented to the regular reflector 253 (FIG. 4).

Specifically, an image is read (hereinafter sometimes referred to as "scanned") by diffuse reflection at the first position of the light emitter 251. When the carriage 25 then returns to a home position P1, the switching mechanism 50 (not illustrated in FIGS. 3 and 4) rotates the light emitter 251 to the second position. Thus, an image is read by regular reflection.

As illustrated in FIG. 3, the diffuse reflector 252 is disposed, compared with the regular reflector 253, away from the optical path C3 from the radiation area R1 to the mirror 254 laterally in the horizontal direction to the light emitter 251 at the first position so that an acute angle ("Θ1" in FIG. 3) is formed from the optical path C3 with respect to the radiation area R1.

Therefore, a part of the light emitted from the light emitter 251 at the first position is directly radiated to the radiation area R1, and another part of the light is radiated by the diffuse reflector 252 to the radiation area R1 along the first optical path C1 at the acute angle from the optical path C3. Then, diffuse reflection light reflected by the sheet S travels to the mirror 254 along the optical path C3.

As illustrated in FIG. 4, the regular reflector 253 is disposed close to the optical path C3 from the radiation area R1 to the mirror 254 laterally in the horizontal direction to the light emitter 251 at the second position so that a more acute angle ("Θ2" in FIG. 4) is formed from the optical path C3 with respect to the radiation area R1, that is, the angle from the radiation area R1 becomes close to the right angle.

Therefore, the light emitted from the light emitter 251 at the second position is radiated by the regular reflector 253 to the radiation area R1 along the second optical path C2 at the more acute angle from the optical path C3. Then, regular reflection light reflected by the sheet S travels to the mirror 254 along the optical path C3.

As indicated by the optical path C3 in FIGS. 3 and 4, the mirror 254 is disposed vertically below the radiation area R1 serving as the reading area. The light reflected by the sheet S serving as the image capturing target includes both the diffuse reflection light and the regular reflection light. The light traveling along the common optical path C3 is reflected by the mirror 254 and guided to the image sensor 28 via the carriage 26.

Although the diffuse reflector 252 and the regular reflector 253 are disposed so that the reflected light from the sheet S is guided to the image sensor 28 along the optical path C3 common to the diffuse reflection light and the regular reflection light, the light radiation timings differ from each other.

Further description is made about the mutual disposition of the diffuse reflector 252 and the regular reflector 253 in the carriage 25. The regular reflector 253 is positioned closer to the mirror 254 than is the diffuse reflector 252 so that the light emitted from the light emitter 251 at the first position does not enter the regular reflector 253.

(2.2) Switching Mechanism

The carriage 25 has the elongated shape with its longitudinal direction corresponding to the main scanning direction Y. In the light emitter 251 disposed in the carriage 25, the light source 251a, the light guide 251b, and the exit surface 251c are members whose longitudinal directions corresponding to the main scanning direction Y. As illustrated in FIG. 5A, the light emitter 251 is rotatably supported by the rotation shaft 251d. A gear G1 is attached to one end of the rotation shaft 251*d* as an example of a rotator. The light emitter 251 is rotated by driving the gear G1 to rotate.

As illustrated in FIG. 5B, the switching mechanism 50 including a gear train R including a partially toothless gear G2 and a motor MT serving as a driver is disposed at the movement end P2 of the carriage 25. As illustrated in FIG. 5B, the partially toothless gear G2 includes a toothless portion G2*b* with no teeth G2*a*, and is held by a spring SR and a solenoid 51 at a position where the toothless portion G2*b* may receive the gear G1 of the moving carriage 25 (arrow in FIG. 5B).

When the carriage 25 moves while reading an image and the gear G1 attached to one end of the rotation shaft 251*d* is received by the toothless portion G2*b* of the partially toothless gear G2 at the movement end P2, the motor MT is driven to rotate and the partially toothless gear G2 rotates via the gear train R to mesh with the gear G1, thereby rotating the light emitter 251. For example, the first optical path C1 is switched to the second optical path C2.

Figure 6:
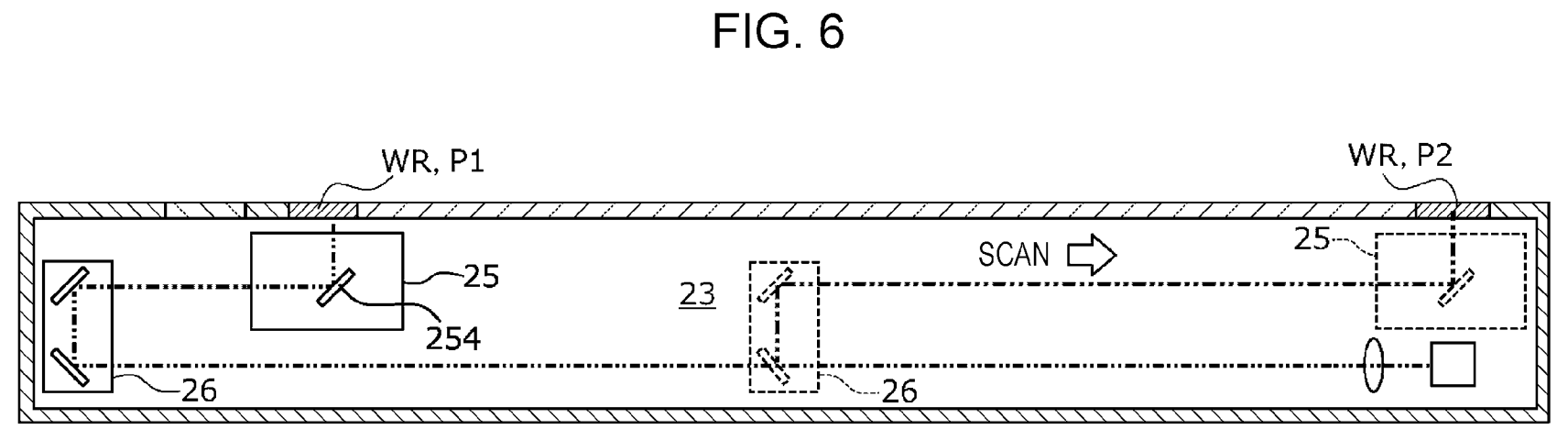

The switching mechanism 50 may be provided also at the home position P1 (see FIG. 6).

(2.3) Switching Operation

FIG. 6 is a schematic sectional view of the image reader 23, illustrating disposition of a white reference plate WR.

When the switching mechanism 50 switches the first optical path C1 for image reading by diffuse reflection to the second optical path C2 for image reading by regular reflection, reflected light from the white reference plate WR serving as a reference to correct the read image is read to adjust the switching to the second optical path C2. Specifically, the carriage 25 moves to the substantially central position of the white reference plate WR before reading an image by regular reflection along the second optical path C2 to adjust the rotation amount of the light emitter 251 so that a predetermined light intensity is obtained from a signal obtained by irradiating the white reference plate WR. As illustrated in FIG. 6, the white reference plate WR may be provided both at the home position P1 and at the movement end P2 of the carriage 25.

Modification 1

Figures 7A, 7B:
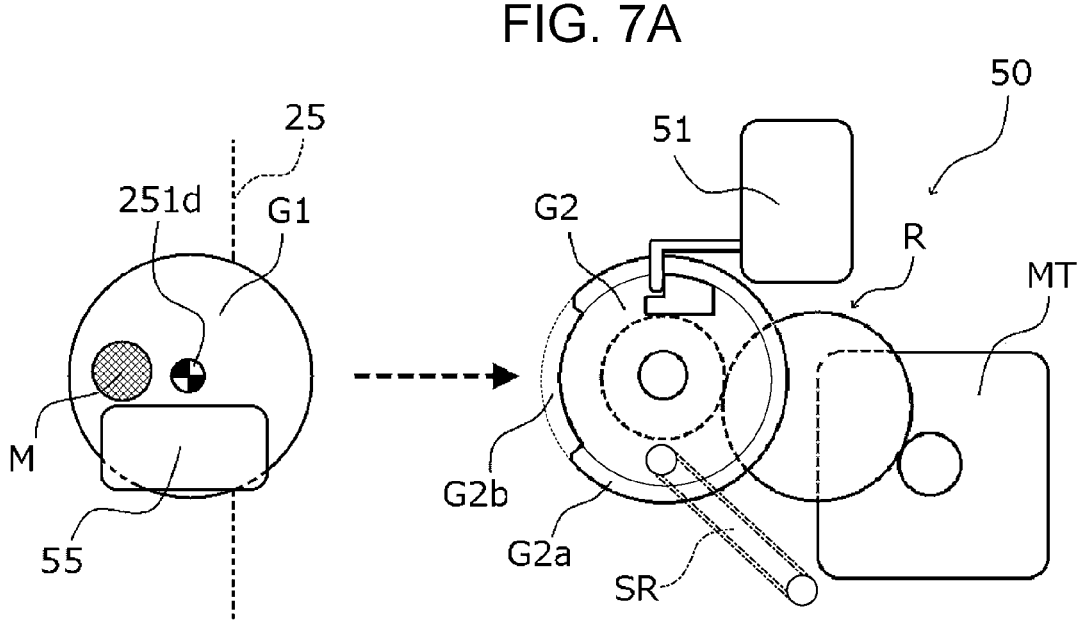
FIG. 7A illustrates adjustment of the rotation amount of the switching mechanism according to Modification 1.
FIG. 7B illustrates adjustment of the rotation amount of the switching mechanism according to Modification 2.

FIG. 7A illustrates adjustment of the rotation amount of the switching mechanism 50 according to Modification 1.

The switching mechanism 50 includes a magnetic field sensor 55 as a detector that detects the movement amount (rotation amount) of the rotation shaft 251*d* of the light emitter 251. The switching mechanism 50 adjusts the switching to the second optical path C2 based on the amount detected by the magnetic field sensor 55. Specifically, a magnetic member M is embedded in the gear G1 and generates a magnetic field in a direction orthogonal to the rotation direction of the gear G1. The magnetic field sensor 55 faces the magnetic member M and detects the rotation of the gear G1 by detecting the magnetic field as a sinusoidal voltage signal different in terms of the phase by 90°. The switching mechanism 50 adjusts the rotation amount of the light emitter 251 based on the amount detected by the magnetic field sensor 55.

Modification 2

FIG. 7B illustrates adjustment of the rotation amount of the switching mechanism 50 according to Modification 2.

The switching mechanism 50 includes a rotary solenoid 56 stoppable at a predetermined rotation amount. The switching mechanism 50 adjusts the switching to the second optical path C2 based on the rotation amount of the rotary solenoid 56. Specifically, the rotary solenoid 56 is directly attached to one end of the partially toothless gear G2 and the switching to the second optical path C2 is adjusted based on the rotation amount of the rotary solenoid 56. The rotary solenoid 56 to be used herein may be configured to finely change the rotation angle depending on a current to flow, thereby finely adjusting the rotation angle of the partially toothless gear G2.

(2.4) Reading Operation

Figure 8A:
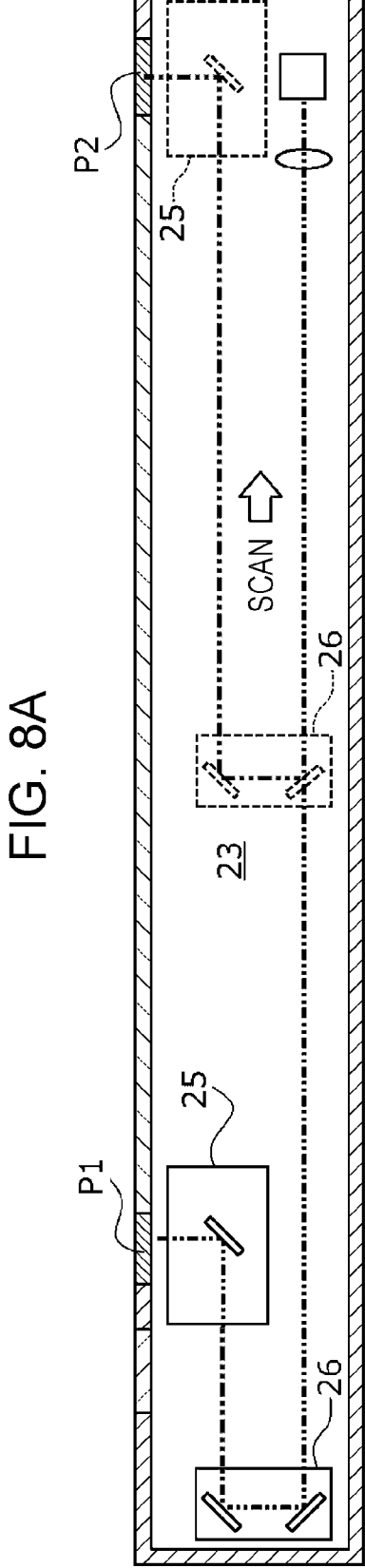
FIG. 8A illustrates the image reader that reads a sheet with the carriage moving in a sub-scanning direction from a home position.
Figure 8B:
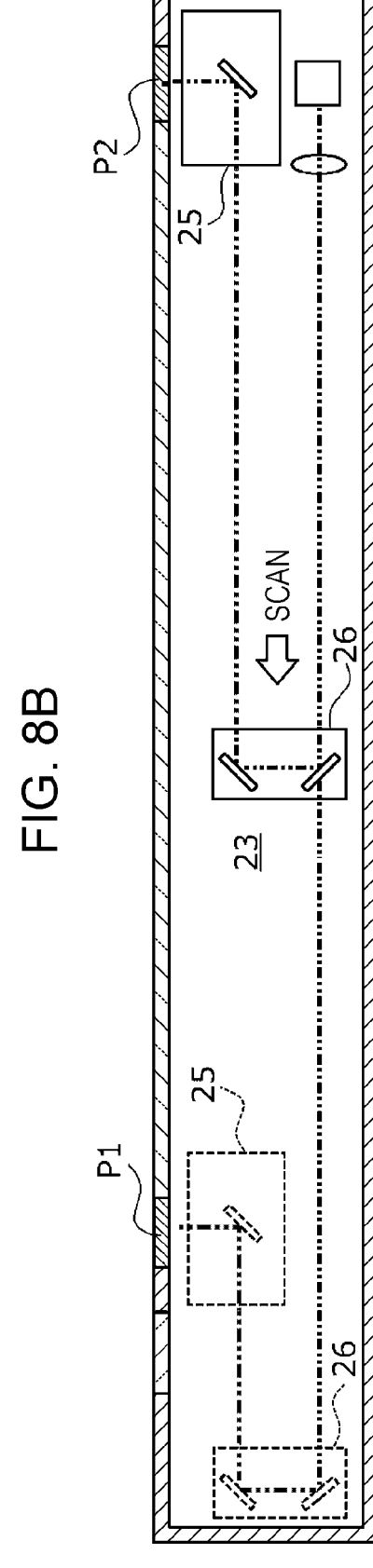
FIG. 8B illustrates the image reader that reads the sheet with the carriage returning to the home position from a movement end.

FIG. 8A illustrates the image reader 23 that reads a sheet S with the carriage 25 moving in the sub-scanning direction X from the home position P1. FIG. 8B illustrates the image reader 23 that reads the sheet S with the carriage 25 returning to the home position P1 from the movement end P2. The reading operation of the image reader 23 is described below with reference to the drawings.

Example 1

The image reader 23 turns ON the light emitter 251 at the first position, reads a first sheet S while moving the carriage 25 and the carriage 26 to the movement end P2 in the sub-scanning direction X, and generates image data indicating an image of diffuse reflection light (see FIG. 8A).

When the gear G1 attached to one end of the rotation shaft 251*d* in the carriage 25 having moved to the movement end P2 in the sub-scanning direction X is received by the toothless portion G2*b* of the partially toothless gear G2 at the movement end P2, the motor MT is driven to rotate and the partially toothless gear G2 rotates. Therefore, the partially toothless gear G2 meshes with the gear G1 to rotate the light emitter 251. Thus, the first optical path C1 is switched to the second optical path C2.

The image reader 23 reads the sheet S while returning the carriage 25 and the carriage 26 to the home position P1, and generates image data indicating an image of regular reflection light from the sheet S (see FIG. 8B).

The carriage 25 and the carriage 26 move to the movement end P2 in the sub-scanning direction X, the switching mechanism 50 rotates the light emitter 251 to switch the second optical path C2 to the first optical path C1, and the carriage 25 and the carriage 26 return to the home position P1.

The image reader 23 reads a second sheet S while moving the carriage 25 and the carriage 26 to the movement end P2 in the sub-scanning direction X again, and generates image data indicating an image of diffuse reflection light (see FIG. 8A).

At the movement end P2 in the sub-scanning direction X, the switching mechanism 50 rotates the light emitter 251 in the carriage 25 having moved to the movement end P2 to switch the first optical path C1 to the second optical path C2. The image reader 23 reads the second sheet S while returning the carriage 25 and the carriage 26 to the home position P1, and generates image data indicating an image of regular reflection light (see FIG. 8B).

The image reader 23 may turn ON the light emitter 251 at the second position, read a sheet S while moving the carriage 25 and the carriage 26 to the movement end P2 in the sub-scanning direction X, and generate image data indicating an image of regular reflection light. Then, the switching mechanism 50 may switch the second optical path C2 to the first optical path C1 at the movement end P2, and the image reader 23 may read the sheet S while returning the carriage 25 and the carriage 26 to the home position P1, and generate image data indicating an image of diffuse reflection light.

Example 2

The image reader 23 turns ON the light emitter 251 at the first position, reads a first sheet S while moving the carriage 25 and the carriage 26 to the movement end P2 in the sub-scanning direction X, and generates image data indicating an image of diffuse reflection light (see FIG. 8A).

When the gear G1 attached to one end of the rotation shaft 251*d* in the carriage 25 having moved to the movement end P2 in the sub-scanning direction X is received by the toothless portion G2*b* of the partially toothless gear G2 at the movement end P2, the partially toothless gear G2 rotates to mesh with the gear G1, thereby rotating the light emitter 251. Thus, the first optical path C1 is switched to the second optical path C2. The image reader 23 reads the sheet S while returning the carriage 25 and the carriage 26 to the home position P1, and generates image data indicating an image of regular reflection light from the sheet S (see FIG. 8B).

With the second optical path C2 maintained, the image reader 23 reads a second sheet S while moving the carriage 25 and the carriage 26 to the movement end P2 in the sub-scanning direction X, and generates image data indicating an image of regular reflection light (see FIG. 8A). At the movement end P2, the switching mechanism 50 rotates the light emitter 251 to switch the second optical path C2 to the first optical path C1, and the image reader 23 reads the sheet S while returning the carriage 25 and the carriage 26 to the home position P1, and generates image data indicating an image of diffuse reflection light (see FIG. 8B).

The image reader 23 may turn ON the light emitter 251 at the second position, read a sheet S while moving the carriage 25 and the carriage 26 to the movement end P2 in the sub-scanning direction X, and generate image data indicating an image of regular reflection light. Then, the switching mechanism 50 may switch the second optical path C2 to the first optical path C1 at the movement end P2, and the image reader 23 may read the sheet S while returning the carriage 25 and the carriage 26 to the home position P1, and generate image data indicating an image of diffuse reflection light.

Example 3

The image reader 23 includes switching mechanisms 50 at the movement end P2 of the carriage 25 in the sub-scanning direction X and at the home position P1 to switch the first optical path C1 and the second optical path C2 at the movement end P2 in the sub-scanning direction X and at the home position P1.

Specifically, the image reader 23 turns ON the light emitter 251 at the first position, reads a first sheet S while moving the carriage 25 and the carriage 26 to the movement end P2 in the sub-scanning direction X, and generates image data indicating an image of diffuse reflection light (see FIG. 8A).

The light emitter 251 in the carriage 25 having moved to the movement end P2 in the sub-scanning direction X rotates at the movement end P2, and the first optical path C1 is switched to the second optical path C2. The image reader 23 reads the sheet S while returning the carriage 25 and the carriage 26 to the home position P1, and generates image data indicating an image of regular reflection light from the sheet S (see FIG. 8B).

The light emitter 251 in the carriage 25 having moved to the home position P1 rotates at the home position P1, and the second optical path C2 is switched to the first optical path C1. The image reader 23 reads a second sheet S while moving the carriage 25 and the carriage 26 to the movement end P2 in the sub-scanning direction X, and generates image data indicating an image of diffuse reflection light (see FIG. 8A).

The light emitter 251 in the carriage 25 having moved to the movement end P2 in the sub-scanning direction X rotates at the movement end P2, and the first optical path C1 is switched to the second optical path C2. The image reader 23 reads the sheet S while returning the carriage 25 and the carriage 26 to the home position P1, and generates image data indicating an image of regular reflection light from the sheet S (see FIG. 8B).

In this exemplary embodiment, one light emitter 251 rotates on the downstream side in the movement direction of the carriage 25 to switch the first optical path C1 and the second optical path C2, thereby separately reading the image of the diffuse reflection light and the image of the regular reflection light for each of the plurality of sheets S serving as the image capturing target.

For example, a process for obtaining one image with reproduced gloss is performed by using the pieces of image data indicating the two generated images.

Second Exemplary Embodiment

Figure 9:
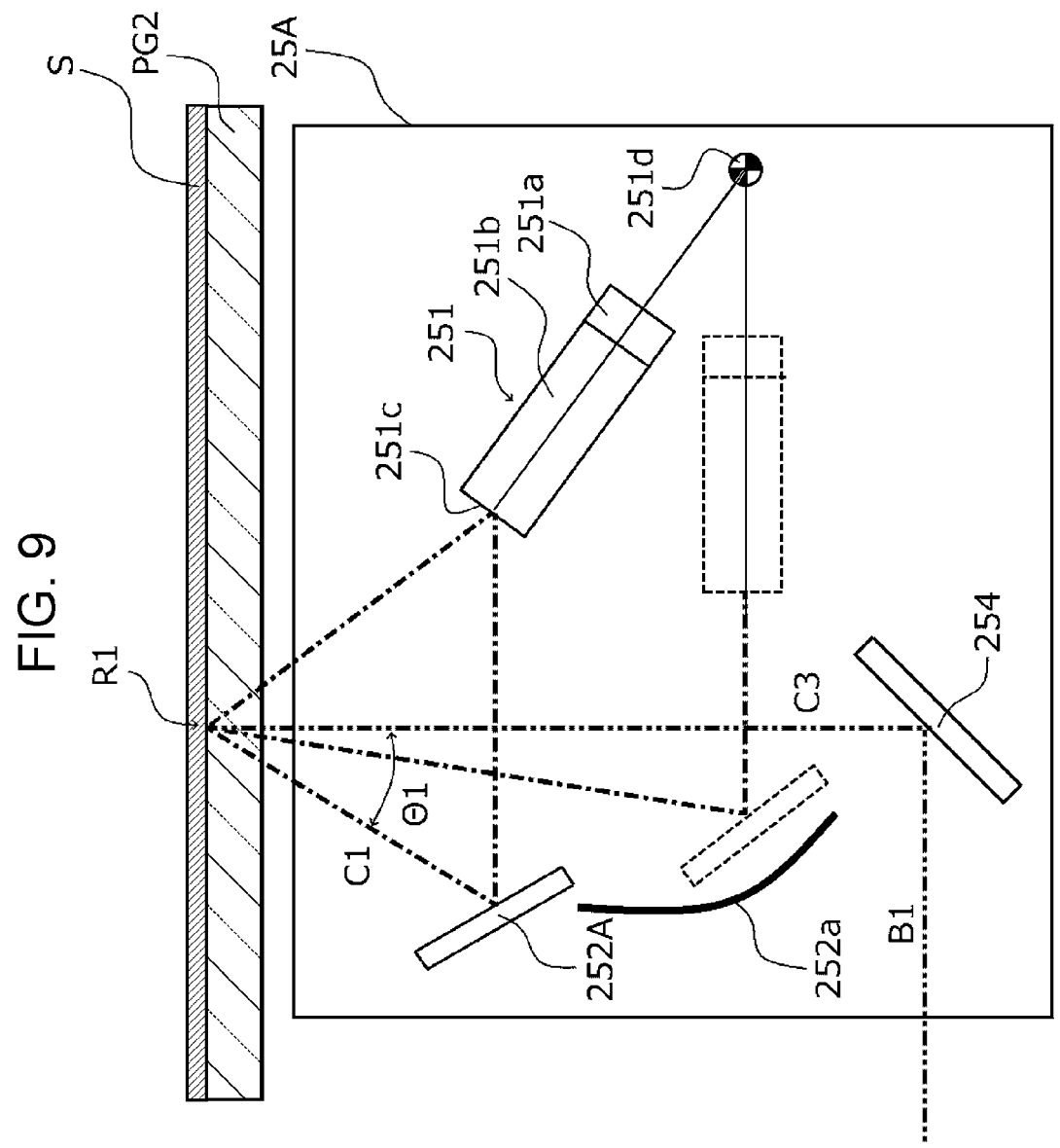
FIG. 9 is a schematic enlarged sectional view illustrating the internal structure of a carriage in which a reflector is at a diffuse reflection position.
Figure 10:
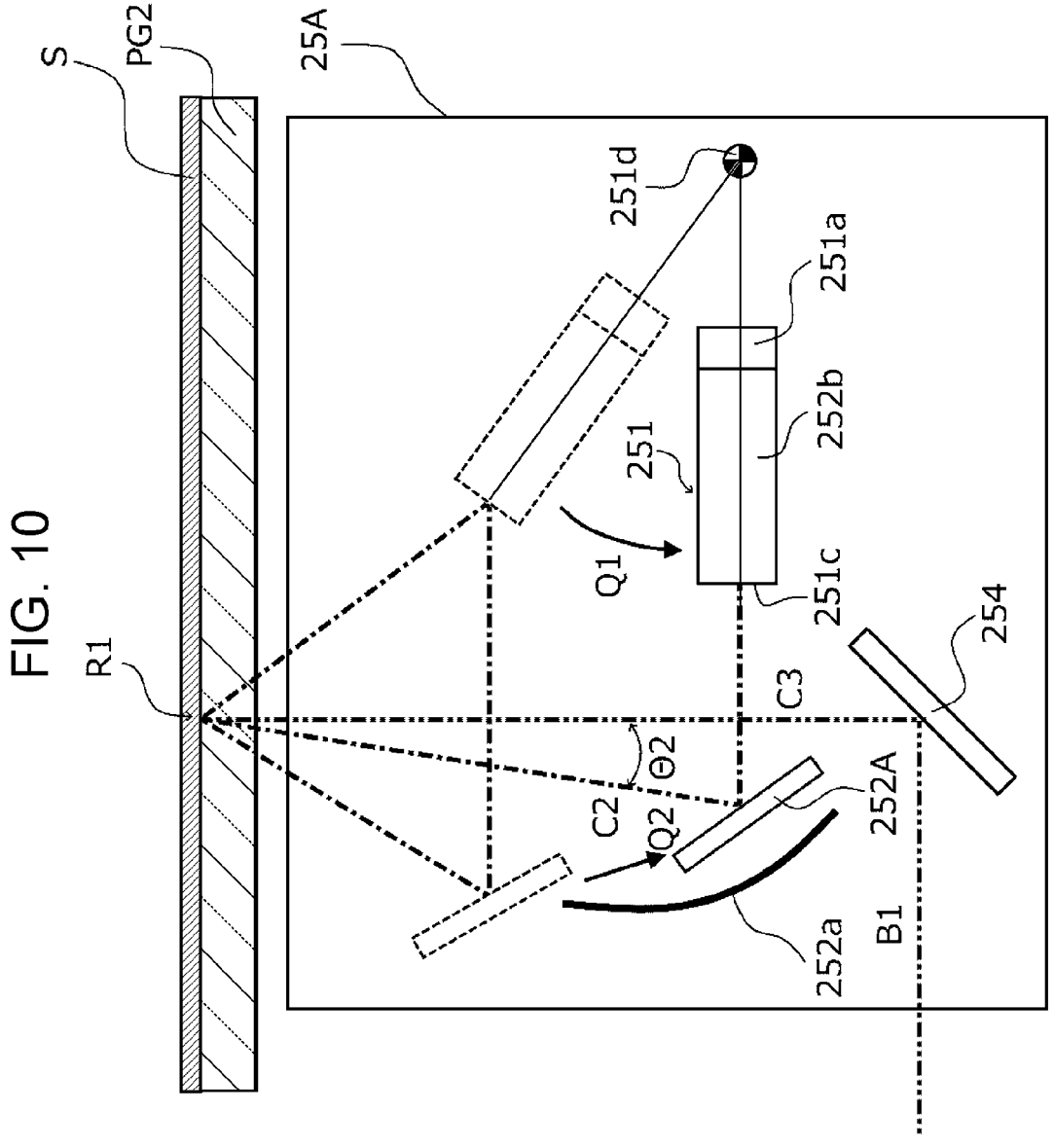
FIG. 10 is a schematic enlarged sectional view illustrating the internal structure of the carriage in which the reflector is at a regular reflection position.

FIG. 9 is a schematic enlarged sectional view illustrating the internal structure of a carriage 25A in which a reflector is at a diffuse reflection position. FIG. 10 is a schematic enlarged sectional view illustrating the internal structure of the carriage 25A in which the reflector is at a regular reflection position.

The structure and operation of an image reader 23A according to a second exemplary embodiment are described below with reference to the drawings.

The image reader 23A according to the second exemplary embodiment switches the first optical path C1 and the second optical path C2 by moving a reflector 252A serving as the reflection surface that reflects the light radiated by the light emitter 251 to irradiate the surface of the sheet S in the radiation area. In this regard, the image reader 23A differs from the image reader 23 of the first exemplary embodiment that switches the first optical path C1 and the second optical path C2 by rotating the light emitter 251. Thus, parts in common with those in the first exemplary embodiment are represented by the same reference symbols to omit detailed description thereof.

The carriage 25A includes the light emitter 251, the reflector 252A, and the mirror 254. The light emitter 251 is an example of the radiator that radiates light. The reflector 252A reflects the light radiated by the light emitter 251 to irradiate the surface of the sheet S in the radiation area. The mirror 254 is disposed vertically below the radiation area R1 serving as the reading area, and reflects, toward the carriage 26, reflected light on the optical path C3 common to the first optical path C1 on which diffuse reflection light to be diffusely reflected by the surface of the sheet S is guided to the image sensor 28 as a read image and the second optical path C2 on which regular reflection light to be regularly reflected by the surface of the sheet S is guided to the image sensor 28 as a read image.

The reflector 252A includes a guide 252*a*. As illustrated in FIGS. 9 and 10, the reflector 252A moves along the guide 252*a* (arrow Q2 in FIG. 10) to the diffuse reflection position in the carriage 25A where an acute angle ("Θ1" in FIG. 9) is formed from the optical path C3 or to the regular reflection position in the carriage 25A where a more acute angle ("Θ2" in FIG. 10) is formed from the optical path C3.

The light emitter 251 includes the rotation shaft 251*d* at the end of the light source 251*a*. The light guide 251*b* of the light emitter 251 integrally rotates about the rotation shaft 251*d* (arrow Q1 in FIG. 10) depending on the position of the reflector 252A. Therefore, the light emitter 251 moves to the first position where a part of the exit surface 251c is oriented to the reflector 252A at the diffuse reflection position (FIG. 9) or the second position where the exit surface 251c is oriented to the reflector 252A at the regular reflection position (FIG. 10).

In this manner, the first optical path C1 on which the light radiated from the light emitter 251 is reflected by the reflector 252A at the diffuse reflection position so that diffuse reflection light diffusely reflected by the surface of the sheet S is guided to the image sensor 28 as a read image and the second optical path C2 on which the light radiated from the light emitter 251 is reflected by the reflector 252A at the regular reflection position so that regular reflection light regularly reflected by the surface of the sheet S is guided to the image sensor 28 as a read image are switchable in the carriage 25A.

Switching mechanisms that switch the first optical path C1 and the second optical path C2 in the carriage 25A are provided at the movement end P2 on the downstream side in the movement direction of the carriage 25A and at the home position P1. The switching mechanisms include the switching mechanism 50 that, similarly to the first exemplary embodiment, includes the motor MT and the gear train R including the partially toothless gear G2 and switches the first position and the second position by rotating the light emitter 251, and a switching mechanism 50A (not illustrated) that switches the reflector 252A to the diffuse reflection position or the regular reflection position by receiving, for example, a cam follower (not illustrated) attached to one end of the reflector 252A.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
a radiator configured to radiate light;
a light receiver configured to receive the light reflected from an image capturing target;
a first optical path on which the light radiated by the radiator is reflected by a reflection surface to irradiate a surface of the image capturing target in a radiation area so that diffuse reflection light diffusely reflected by the surface of the image capturing target is guided to the light receiver as a read image;
a second optical path on which the light radiated by the radiator is reflected by the reflection surface to irradiate the surface of the image capturing target in the radiation area so that regular reflection light regularly reflected by the surface of the image capturing target is guided to the light receiver as a read image; and
a switcher configured to switch the first optical path and the second optical path on a downstream side in a movement direction of a carriage that houses the radiator and the reflection surface and moves along a sub-scanning direction for image reading.

2. The reading device according to claim 1, wherein the switcher is configured to switch the first optical path and the second optical path by rotating the radiator.

3. The reading device according to claim 2,
wherein the switcher comprises a partially toothless gear configured to mesh with a rotator provided in the carriage, and
wherein the switcher is configured to rotate the radiator by driving the partially toothless gear to rotate.

4. The reading device according to claim 1, wherein the switcher is configured to switch the first optical path and the second optical path by moving the reflection surface.

5. The reading device according to claim 1, wherein, in response to switching to the second optical path by the switcher, the switching to the second optical path is adjusted by reading reflected light from a white reference plate serving as a reference to correct the read image.

6. The reading device according to claim 2, wherein, in response to switching to the second optical path by the switcher, the switching to the second optical path is adjusted by reading reflected light from a white reference plate serving as a reference to correct the read image.

7. The reading device according to claim 3, wherein, in response to switching to the second optical path by the switcher, the switching to the second optical path is adjusted by reading reflected light from a white reference plate serving as a reference to correct the read image.

8. The reading device according to claim 4, wherein, in response to switching to the second optical path by the switcher, the switching to the second optical path is adjusted by reading reflected light from a white reference plate serving as a reference to correct the read image.

9. The reading device according to claim 1, further comprising a detector configured to detect a movement amount of the switcher,
wherein switching to the second optical path is adjusted based on the movement amount detected by the detector.

10. The reading device according to claim 2, further comprising a detector configured to detect a movement amount of the switcher,
wherein switching to the second optical path is adjusted based on the movement amount detected by the detector.

11. The reading device according to claim 3, further comprising a detector configured to detect a movement amount of the switcher,
wherein switching to the second optical path is adjusted based on the movement amount detected by the detector.

12. The reading device according to claim 4, further comprising a detector configured to detect a movement amount of the switcher,
wherein switching to the second optical path is adjusted based on the movement amount detected by the detector.

13. The reading device according to claim 9, wherein the detector is a rotation detector configured to detect rotation of a magnetic member of a driver configured to drive the switcher.

14. The reading device according to claim 10, wherein the detector is a rotation detector configured to detect rotation of a magnetic member of a driver configured to drive the switcher.

15. The reading device according to claim 11, wherein the detector is a rotation detector configured to detect rotation of a magnetic member of a driver configured to drive the switcher.

16. The reading device according to claim 12, wherein the detector is a rotation detector configured to detect rotation of a magnetic member of a driver configured to drive the switcher.

17. The reading device according to claim 1,
wherein the switcher comprises a rotary solenoid stoppable at a predetermined movement amount, and
wherein switching to the second optical path is adjusted based on a rotation amount of the rotary solenoid.

18. The reading device according to claim 2,
wherein the switcher comprises a rotary solenoid stoppable at a predetermined movement amount, and
wherein switching to the second optical path is adjusted based on a rotation amount of the rotary solenoid.

19. An output device configured to output a regular reflection degree based on the regular reflection light read by the reading device according to claim 1.

20. An image forming apparatus comprising the output device according to claim 19,
wherein the image forming apparatus is configured to output an image formed based on the regular reflection degree read by the reading device.

* * * * *